United States Patent [19]

Cassidy et al.

[11] Patent Number: 5,093,383
[45] Date of Patent: Mar. 3, 1992

[54] POLYURETHANE/UREA FOAMS FROM ISOCYANATE PREPOLYMERS AND ISOCYANATE REACTIVE IMINO/ENAMINO FUNCTIONAL REACTANTS

[75] Inventors: Edward F. Cassidy, Ukkel, Belgium; Herbert R. Gillis, Sterling Heights, Mich.; Malcolm Hannaby, Leuven; Jan W. Leenslag, Neerijse, both of Belgium

[73] Assignees: ICI Americas Inc., Wilmington, Del.; Imperial Chemical Industries plc, London, England

[21] Appl. No.: 400,638

[22] Filed: Aug. 30, 1989

Related U.S. Application Data

[63] Continuation-in-part of Ser. No. 378,445, Jul. 7, 1989, Pat. No. 4,935,460, which is a continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Mar. 11, 1987 [GB] United Kingdom ................. 8705801
Sep. 9, 1988 [GB] United Kingdom ................. 8821166

[51] Int. Cl.$^5$ .............................................. C08G 18/14
[52] U.S. Cl. .................................... 521/159; 521/160; 521/161; 521/162; 521/173; 528/44; 528/59; 524/251
[58] Field of Search ............... 521/159, 160, 161, 162, 521/173; 528/59, 44; 524/251

[56] References Cited

U.S. PATENT DOCUMENTS

| 3,420,800 | 1/1969 | Haggis ................................. 260/75 |
| 3,441,588 | 4/1969 | Wagner et al. ..................... 260/453 |
| 4,342,841 | 8/1982 | Alberino ............................. 521/163 |
| 4,552,945 | 11/1985 | Alberino ............................. 528/62 |
| 4,906,674 | 3/1990 | Cassidy et al. ..................... 528/59 |
| 4,935,460 | 6/1990 | Cassidy et al. ..................... 528/44 |

FOREIGN PATENT DOCUMENTS 0081701 8/1983 European Pat. Off. .
2125247 10/1972 Fed. Rep. of Germany .
2362171 8/1976 France .

Primary Examiner—John Kight, III
Assistant Examiner—Duc Truong

[57] ABSTRACT

Polyurethane/urea foams are derived from prepolymers having branched chain linked isocyanate end groups and components containing isocyanate reactive imino/enamino-functional compounds.

10 Claims, No Drawings

POLYURETHANE/UREA FOAMS FROM ISOCYANATE PREPOLYMERS AND ISOCYANATE REACTIVE IMINO/ENAMINO FUNCTIONAL REACTANTS

This is a continuation-in-part of Ser. No. 07/378,445, filed July 7, 1989, now U.S. Pat. No. 4,935,460, which is a continuation of Ser. No. 07/242,745, filed Sept. 9, 1988, now abandoned, which is a continuation-in-part of Ser. No. 07/160,647, filed Feb. 26,1988, now U.S. Pat. No. 4,794,129, which is a continuation-in-part of Ser. No. 07/105,641, filed Oct. 6, 1987, now abandoned.

This invention relates to compositions of matter useful as reaction systems in the production of mouldings by the reaction injection moulding process and in the production of foams.

One of the more important methods of making isocyanate based cellular and non-cellular elastomers is the technique known as reaction injection moulding (RIM) whereby two highly reactive liquid streams are impingement mixed and rapidly injected into a mould cavity. The two streams generally comprise a polyisocyanate or derivative thereof, usually known as the "A" component, and an isocyanate reactive stream known as the "B" component, commonly containing polyol and/or polyamine reactants.

It has now been found that reaction systems in which the "A" component comprises certain modified polyisocyanates as defined below and in which the "B" component comprises an imino or enamine functional compound are especially useful in the production of RIM elastomers and can be processed on conventional equipment to give elastomers having a high level of physical properties.

Accordingly, the present invention provides a reaction system for use in making a reaction injection moulded elastomer, said system comprising the following components :

(A) a polyisocyanate comprising a polyisocyanate having a molecular weight greater than 600 of the general formula :

$$T_m(R)_n \qquad (1)$$

wherein T represents a chain of more than 30 atoms, m represents an integer of at least 1, R represents an isocyanate group containing residue and n is an integer of at least 2, at least one of the residues represented by R containing at least 2 isocyanate groups separated one from another by a chain of from 2 to 30 atoms and the sum of the residues represented by R constituting less than 50 % of the total molecule on a weight basis, and (B) an isocyanate-reactive component comprising an imino-functional compound and/or an enamine-containing compound.

References herein to the number of atoms present in a chain indicate the number of atoms present in the backbone of a chain but not hydrogen atoms or other substituents attached to backbone atoms. Thus, in a poly(propylene oxide)chain, the carbon and oxygen atoms constituting the backbone of the chain are counted but not the attached hydrogen atoms or the atoms present in the methyl substituents.

Unless otherwise stated, the expressions "equivalent weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

As examples of the types of chain represented by T in the polyisocyanates of Formula 1, there may be mentioned polyesters, polyesteramides, polycarbonates, polythioethers, polyacetals, polyolefins, hydrocarbons, polysiloxanes and, especially, polyethers.

The polyisocyanates of Formula 1 preferably have molecular weights greater than 1800 with each T being a chain of more than 70, preferably more than 100 atoms in length, wherein the isocyanate-containing residues are located at the ends of the chains. Especially preferred polyisocyanates have molecular weights in the range 2,500 to 10,000, while some are operable up to 12,000. It is also preferred that the ratio of the molecular weight of the polyisocyanate of Formula 1 to the number of isocyanate group containing residues R in the molecule is not less than 800, more preferably not less than 1000 and most preferably not less than 1200. It is desirable that at least two of these contain at least two isocyanate groups per residue with a preferred maximum of four isocyanate groups in any residue. The overall isocyanate equivalent weight of the polyisocyanates of Formula 1 is preferably not less than 500, more preferably not less than 750 and most preferably not less than 850. The isocyanate groups within an isocyanate group containing residue are suitably separated by a chain of not more than 25 atoms. Preferably, the polyisocyanate of Formula 1 constitutes at least 10%, preferably greater than 20% of the weight of the total polyisocyanates.

Examples of polyisocyanates of Formula 1 include products obtained by reacting polymeric polyols with organic polyisocyanates under conditions such that the initially formed urethane-modified polyisocyanates are converted to allophanate-modified polyisocyanates terminating in isocyanate group containing residues of the formula:

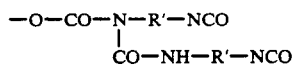

wherein R, represents a divalent hydrocarbon residue.

Organic polyisocyanates which may be used in the preparation of the allophanate-modified polyisocyanates include aliphatic, cycloaliphatic and aralphatic polyisocyanates, for example hexamethylene diisocyanate, isophorone diisocyanate, cyclohexane-1,4'-diisocyanate, dicyclohexylmethane-4,4'-diisocyanate and p-xylylene diisocyanate. The preferred polyisocyanates, however, are the aromatic polyisocyanates, for example phenylene diisocyanates, tolylene diisocyanates, 1,5-naphtylene diisocyanate and especially the available MDI isomers, that is to say 4,4'-diphenylmethane diisocyanate, 2,4'-diphenylmethane diisocyanate and mixtures thereof. Whilst diisocyanates are the preferred polyisocyanates for use in the preparation of the polyisocyanates of Formula 1, mixtures of diisocyanates with minor proportions of higher functionality polyisocyanates may be used if desired. Thus, MDI variants such as uretonimine-modified MDI may be used.

Polymeric polyols which may be used in the preparation of the allophanate-modified polyisocyanates preferably have average nominal hydroxyl equivalent weights in the range 750 to 5000. Particularly preferred polymeric polyols have average nominal hydroxyl functionalities of 2 or 3 and average hydroxyl equivalent weights in the range from about 1000 to about 3000. Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, bis(hydroxyethyl)terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures Polyesters obtained by the polymerisation of lactones, for example caprolactone, in conjunction with a polyol, may also used.

Polythioether polyols which may be used include products obtained by condensing thiodiglycol either alone or with other glycols, alkylene oxides, dicarboxylic acids, formaldehyde, amino-alcohols or aminocarboxylic acids Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepare by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols. In preparing the allophanate-modified polyisocyanates, the polyisocyanate and the polyol may be reacted together using conditions that have been fully described in the prior art for the production of urethane prepolymers. Thus, one or more polyisocyanates may be reacted with one or more polyols under substantially anhydrous conditions at temperature between about 50° and about 110° C., optionally in the presence of catalysts, until the formation of urethane groups by reaction between the isocyanate groups and the hydroxyl groups is substantially complete. Reaction between the urethane groups and the excess of polyisocyanate is then allowed to take place so that at least about 20%, preferably at least 50%, and optionally up to 100% of the initially formed urethane groups are converted to allophanate groups. This process may be assisted by catalysis. Suitable catalysts are known in the polyurethane art and include tin compounds such as dibutyltin dilaurate and sulphonic acids. It is preferable to avoid those catalysts which, under the conditions of prepolymer formation promote competing isocyanate reactions such as trimerisation.

In preparing the allophanate-modified polyisocyanates, the organic polyisocyanate and the polyol are suitably reacted in such proportions that the initial NCO/OH is at least about 2:1, preferably greater than about 5:1. One convenient method of preparing the compositions involves adding the polyol gradually to the total amount of organic polyisocyanate so as to minimise chain extension.

Examples of other polyisocyanates of Formula 1 include products obtained by reacting polymeric polyamines with organic polyisocyanates under conditions such that the initially formed urea-modified polyisocyanates are converted to biuret-modified polyisocyanates terminating in isocyanate group containing residues of the formula :

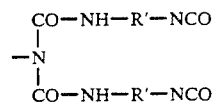

wherein R' is as defined above.

Organic polyisocyanates which may be used in the preparation of the biuret-modified polyisocyanates include those mentioned above with reference to the preparation of the allophanate-modified polyisocyanates. Polymeric polyamines which may be used particularly include polyether triamines and, especially, polyether diamines having average amino equivalent weights in the range 500 to 5000, preferably from about 1000 to about 3000. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred.

In preparing the biuret-modified polyisocyanates, the organic polyisocyanate and the polyamine may be reacted together using conditions similar to those described above for the preparation of the allophanate-modified polyisocyanates.

Examples of further polyisocyanates of Formula 1 include products obtained by reacting organic polyisocyanates, for example those already mentioned, with imino-functional or enamine-containing compounds having molecular weights of at least 1000.

"Imino-functional" as used herein means that a compound contains the grouping :

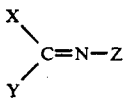

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms, said compound being capable of reacting directly with polyisocyanates without prior cleavage of the C=N bond to form a monomeric byproduct.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

Suitable imino-functional compounds include imino-functional polyether resins having molecular weights of at least 1000, preferably 2000 to 8000 and an average imino functionality of at least 1.1, preferably from about 2 to about 4.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature.

Enamine-containing compounds which may be used in the preparation of the polyisocyanates of Formula 1 include compounds having the structures :

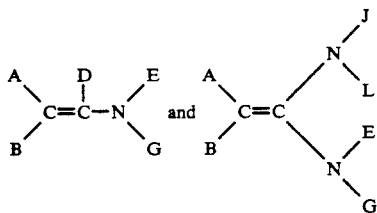

wherein each of A, B, D, E, G and L, independently, represents hydrogen or an optionally substituted hydrocarbon radical, any of A, B and D and, independently, any of E, G, J and L optionally being joined together to form one or more carbocyclic or heterocyclic rings.

Preferred enamino-functional compounds include enamino-functional polyether resins having molecular weights of at least 1000, preferably 2000 to 8000 and an average enamine functionality of at least 1.1, preferably from about 2 to about 4.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propion-aldehyde, isobutyraldehyde, caproaldehyde, cyclohexyl aldehyde, acetone, methyl ethyl ketone, benzyl methyl ketone, cyclopentanone, cyclohexanone, trimethylcyclohexanaone, mixtures of these and the like with a secondary amine, for example a secondary amino-terminated polymer such as a polyether.

General techniques for the synthesis of enamines have been described in, for example, Org. coatings and Plastics Chem., 44. 151 and 157, (1981), ACS-PMSE preprints, August/September 1983, 456 and 461, and U.S. Pat. Nos. 4, 342,841 and 4,552,945.

If desired, the imino-functional or enamine-containing compounds may contain amide, imide, thioether, siloxane or other linkages in addition to, or instead of, ether linkages provided that these are chemically inert towards the imino or enamine end groups.

In preparing polyisocyanates of Formula 1, the organic polyisocyanate and imino-functional and/or enamine-containing compound are reacted together at ambient or elevated temperatures, optionally in the presence of catalysts. The organic polyisocyanate and the imino-functional and/or enamine-containing compound are suitably reacted in a molar ratio of at least about 3:1, preferably greater than about 6:1. One convenient method of preparing the compositions involves adding the imine or enamine gradually to the total amount of organic polyisocyanate so as to minimise chain extension.

If desired, polyisocyanates of Formula 1 may be prepared by reacting organic polyisocyanates with mixtures of any of the above mentioned polyols, polyamines, imino-functional compounds and/or enamine-containing compounds.

Further polyisocyanates of Formula 1 may be obtained by the reaction of a stoichiometric excess of an organic polyisocyanate, especially the diisocyanates mentioned above, with an isocyanate-reactive compound having a molecular weight greater than 600 of the general formula:

$$V_p(W)_q \qquad (2)$$

wherein V represents a chain of more than 30 atoms, p represents an integer of at least 1, W represents an isocyanate-reactive group containing residue and q is an integer of at least 2, at least one of the residues represented by W containing at least 2 isocyanate-reactive groups separated one from another by a chain of from 2 to 10 atoms and the sum of the residues represented by W constituting less than 50%, preferably less than 25% of the total molecule on a weight basis.

As examples of the types of chain represented by V in the isocyanate-reactive compounds of Formula 2, there may be mentioned polyesters, polyesteramides, polycarbonates, polythio-ethers, polyacetals, polyolefins, polysiloxanes and, especially, polyethers.

The isocyanate-reactive compounds of Formula 2 preferably have molecular weights greater than 1800 with each V being a chain of more than 70, preferably more than 100, atoms in length, wherein the isocyanate-reactive group containing residues are located at the ends of chains. Especially preferred isocyanate-reactive compounds have molecular weights in the range 2,000 to 10,000. It is also preferred that the ratio of the molecular weight of the isocyanate-reactive compound of Formula 2 to the number of isocyanate-reactive group containing residues W in the molecule is not less than 800, more preferably not less than 1000 and most preferably not less than 1200. It is desirable that at least two of these contain at least two isocyanate-reactive groups per residue with a preferred maximum of four isocyanate-reactive groups in any residue. The overall equivalent weight, with respect to the total number of isocyanate-reactive groups, is preferably not less than 500, more preferably not less than 750 and most preferably not less than 850.

Isocyanate-reactive groups which may be present in the isocyanate-reactive compounds of Formula 2 include, for example, hydroxyl, thiol, carboxyl, primary and secondary amino groups and mixtures thereof. The isocyanate-reactive groups within an isocyanate-reactive group containing residue are preferably separated by a chain of not more than 5 atoms.

Examples of isocyanate-reactive compounds of Formula 2 include polyols obtained by end-capping polyether polyols with glycidol.

The A component of the reaction systems of the invention may also contain other polyisocyanates in addition to polyisocyanates of Formula 1 although it is most preferred that the polyisocyanates of Formula 2 constitute at least 25% of the A component on a weight basis. Other polyisocyanates which may be present include the organic polyisocyanates mentioned above as starting materials in the preparation of polyisocyanates of Formula 1.

The B components of the reaction systems of the invention are isocyanate-reactive compositions comprising at least one imino-functional and/or enamine-containing compound present as a chain extender and/or as a softblock component.

Imino-functional and/or enamine-containing compounds suitable as chain extenders typically have molecular weights below 1000, especially between about 100 and about 600. In other respects, for example structure, they may have the characteristics of the higher molecular weight imino-functional or enamine-containing compounds described above. The preferred imino and/or enamine group functionality cf the chain extender is between 1 and about 3.

Examples of preferred imino-functional compounds for use as chain extenders in the reaction systems of the invention include simple aldimines and/or ketimines such as may be obtained by reacting aldehydes, for example formaldehyde, acetaldehyde, propionaldehyde, n-butyraldehyde, isobyturaldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, methyl n-propyl ketone, methyl isopropyl ketone, diethyl ketone, benzyl methyl ketone or cyclohexanone and mixtures thereof with primary amines, especially aliphatic amines. Examples of suitable amines include hexamethylene diamine, menthane diamine, isophorone diamine, xylylene diamine, 2-methyl-pentamethylene diamine, low molecular weight polyoxyalkylene diamines and/or triamines and mixtures of such amines. Primary mono-amines may also be used either alone or together with diamines.

Examples of suitable enamine-containing chain extenders are described in U.S Pat. Nos. 4,342,841 and 4,552,945. Other examples include the bis-enamines formed by reacting piperazine with simple carbonyl compounds such as acetone, methyl ethyl ketone, cyclohexanone and the like.

When present as a softblock component, the imine or enamine will generally have a molecular weight of at least 1500, preferably 2000 to 8000, and an average imino or enamino functionality of at least 1.1, preferably from about 2 to about 4. Such compounds have already been described herein.

If desired, the B component may contain further chain extenders and/or softblock components in addition to imino-functional and/or enamine-containing compounds. Such further chain extenders include polyols and polyamines having molecular weights below 1000, especially below 500. Polyols which may be present as chain extenders include simple non-polymeric diols such as ethylene glycol and 1,4-butanediol whilst polyamines which may be used as chain extenders include aliphatic, cycloaliphatic or araliphatic polyamines containing two or more primary and/or secondary amino groups and, especially, aromatic polyamines.

Aromatic polyamines useful as chain extenders in the reaction systems of the invention particularly include diamines, especially those having molecular weights from about 100 to about 400, preferably between 122 and 300. Suitable diamines have been fully described in the prior art and include 3,5-diethyl-2,4-toluendiamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane,4,4'-diaminodiphenylmethane, 3,3'-dimethyl-5,5'-diethyl-4,4'-diaminodiphenylmethane, 3,3',5,5'-tetraisopropyl-4,4'-diaminodiphenylmethane and the like and mixtures thereof.

Additional softblock materials which may be present in the B component include polyols and polyamines having molecular weights greater than 1500. Suitable polyols include those mentioned above in relation to the preparation of the allophanate-modified polyisocyanates, especially polyether diols and/or triols. Suitable polyamines include the commercially available polyether diamines and/or triamines. Any isocyanate-reactive materials defined by Formula 2 may optionally be included in components B.

Especially valuable B components for use in the reaction systems of the invention are isocyanate-reactive compositions comprising:
(i) a chain extender comprising :
 (a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
 (b) 100–0% of an imino- and/or enamino-functional aliphatic compound having from about 1 to about 3 isocyanate-reactive imino and/or enamine groups per molecule and a molecular weight less than 1000, and
(ii) an imino- and/or enamine functional polyether having an average of from about 1.1 to about 5 isocyanate-reactive imino and/or enamine groups per molecule and an average molecular Weight of from 1000 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

The reaction systems of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organopolysiloxanes bearing organic hydroxyl groups (instead of acids) can also be used. A specific example of a very effective, hydroxy functional, polysiloxane internal mould release additive is L-412T (available from Goldschmidt AG). The amount of internal mould release agent used can be from about 0.001 to about 5.0 percent by weight of the total reactants (i.e., total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkyl-morpholines which include, for example, N-methylmorpholine, N-ethylmorpholine; 2,2'-bis(dimethylamino)diethyl ether; 1,4-di-methylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Another group of catalysts, which are more specific for the isocyanate-amine reaction, and particularly for the reaction of isocyanates with aliphatic imines or enamines, include carboxylic acids and precursors thereof (such as acid anhydrides). Specific examples of carboxylic acid catalysts include oleic acid, 1,12-dodecanedioic acid, isophthalic acid, and the like. These types of catalysts are described in U.S. Pat. Nos. 4,499,254; 4,487,908; and 4,487,912; and in U.S. Pat. No. 3,789,045 (for the imine-isocyanate reaction.)

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fibreglass reinforcement fibres, particularly those having lengths of from about 1/16 inch (0.16 cm) to about ¼ inch (1.27 cm) and milled glass fibres having a length of 1/16 inch (0.1 6 cm), ⅛ inch (0.32 cm) or ¼ inch (0.64 cm) and the like. Shorter fibres are always preferred for ease of processing when they are incorporated as part of the "A" or "B" component streams. Other particularly suitable fillers are mica, fumed silica, flake glass, Wollastonite, calcium carbonate, carbon black, and the like.

The products of the present invention can be shaped into useful articles such as automobile fascias, or panels, by reaction injection moulding (RIM) process, which is performed in a RIM machine.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Kraus Maffei GmbH, West Germany.

The reagents may be blended in a suitable container and agitated at a temperature from about 20° C. to about 100° C. It is preferred to mix and process the ingredients of component (B) at or near ambient (20.C) temperature. The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heattracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.10. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(-SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mould at a velocity from about 0.3 lb./sec. to about 70 lb./sec., preferably 5 to 20 lb./sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

Mould filling may be accomplished in a more facile manner due to the reaction profile of the imino and/or enamine reagents Generally there is an induction period of about 1 to 5 seconds, usually 1 to 3 seconds, during which the reaction between the isocyanate- and the imino or enamine ingredients are flat or retarded. Following this induction period the reaction accelerates noticeably. This behaviour is in sharp contrast to that of the primary aliphatic amines used in polyurea systems of the prior art. These amines appear to begin reacting with aromatic isocyanates on contact. These reaction profiles can be visualised by means of the adiabatic temperature rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds are reacted neat (i.e., free of other ingredients) with the aromatic isocyanates. Moulded objects can be demoulded after a mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

The reaction systems of the invention may also be used in the production of foams having densities in the range 10–400 kg/m$^3$ with the addition, as necessary, of the usual blowing agents, catalysts, surfactants and the like.

The invention is illustrated but not limited by the following Examples in which all parts, percentages and ratios are by weight unless otherwise indicated. In the Examples, Flexural Modulus was determined by ASTM d3769-85 and Impact (falling weight) wa determined by ASTM D3029-84.

EXAMPLE 1

Prepolymer 1 was prepared by reacting 43.9 parts of polypropylene glycol 2000 with 56.1 parts of an 80/20 mixture of 4,4'- and 2,4'-diphenylmethane diisocyanates at 115° C. for 2 hours. The prepolymer so obtained had an NCO content of 16.0%.

EXAMPLE 2

Prepolymer 2 was prepared by reacting 43.9 parts of polypropylene glycol 2000 with 56.1 parts of an 80/20 mixture of 4,4'- and 2,4'-diphenylmethane diisocyanates in the presence of 0.002 part of dibutyltin dilaurate at 115° C. for 2 hours. The allophanate containing prepolymer so obtainied had an NCO content of 14.1%.

EXAMPLE 3

A series of elastomer products were prepared on a Battenfeld SHK-65 machine by reacting the prepolymers of examples 1 and 2 with a number of "B" components, using the RIM technique. As "B" components use was made of the following isocyanate reactive compositions :

Imine Composition A 70 pbw of T-5000* cyclohexanone imine
C 30 pbw of DETDA
*T-5000 is the Texaco "Jeffamine" polyether triamine.

The relative amounts of prepolymers ("A" component) and isocyanate reactive compositions ("B" component) are stated in the following table 1A. The temperature of the mould was maintained a approximately 90° C.

The properties of the elastomer products thus obtained are indicated in the following Table 1B.

TABLE 1

Preparation of elastomer products by the RIM technique.

| | Example No. | | | |
|---|---|---|---|---|
| | 3a | 3b | 3c | 3d |
| A: Amounts of "A" and "B" components | | | | |
| Component "A" (parts/weight) | PREPOLYMER 1 105 | PREPOLYMER 1 115 | PREPOLYMER 2 119 | PREPOLYMER 2 129 |
| Component "B" (parts/weight) | IMINE COMP. A 100 | IMINE COMP. A 100 | IMINE COMP. A 100 | IMINE COMP. A 100 |
| B: Properties of the elastomer products obtained | | | | |
| DENSITY (Kg/m$^3$) | 1112 | 1117 | 1110 | 1125 |
| FLEXURAL MODULUS (MPa) | 284 | 342 | 381 | 402 |
| HARDNESS (SHORE D) | 58 | 63 | 66 | 65 |
| TENSILE STRENGTH (KPa) | 21983 | 26396 | 23900 | 23111 |

TABLE 1-continued

Preparation of elastomer products by the RIM technique.

| | Example No. | | | |
|---|---|---|---|---|
| | 3a | 3b | 3c | 3d |
| ELONG. AT BREAK (%) | 221 | 195 | 153 | 135 |
| IMPACT (J) | | | | |
| +20° C. | 77 | 84 | 66 | 83 |
| −20° C. | 58 | 60 | 64 | 60 |

PREPARATION A

Preparation of poly(oxypropylene)acetoacetate

A 10 liter round bottomed flask in a temperature controlled heating mantle was fitted with a mechanical stirrer, a nitrogen sparge and a vigreux column with Liebig condensor. The flask was charged with 9000 g of a 5000 molecular weight poly(oxypropylene)-triol based on glycerol, 782 g of ethylacetoacetate and 3 ml of tetrabutyltitanate catalyst. The reaction mixture was heated to 160°–170° C. with a gentle sparge of nitrogen. The progress of reaction was monitored by infrared analysis of the condensed volatiles produced during the reaction. After 440 minutes, a further 500 g of ethylacetoacetate and 2 ml of tetrabutyltitanate were added to the reaction mixture. After 690 minutes a sample of distillate contained mainly ethanol as indicated by a peak at 3350 cm$^1$ in the infrared spectrum of the sample. After 810 minutes the vigreux column was removed and heating was continued. Analysis of the distillate at this point showed this material to be mainly ethylacetoacetate. The excess ethylacetoacetate was then removed by the application of vacuum. After all of the volatile components had been removed the product was shown to have a hydroxyl value of 3.5 MgKOH/g indicating greater than 90% conversion to the poly(oxypropylene)acetoacetate.

PREPARATION B

Preparation of a poly(oxypropylene)-(N-cyclohexyl)aminocrotonate

A 10 liter round bottomed flask in a temperature controlled heating mantle was fitted with a mechanical stirrer, a nitrogen sparge and a Dean-Stark apparatus. The flask was charged with 9454 g of the above-described poly(oxypropylene)acetoacetate, 536g of cyclohexylamine and 500 g of toluene. The reaction mixture was heated to reflux and water was collected in the Dean-Stark trap.

After 670 minutes the reaction was considered to be complete as indicated by the absence of further water in the Dean Stark trap. Excess cyclohexylamine and toluene were removed by the application of vacuum. The presence of the aminocrotonate was clearly indicated in the spectra of the product. The infrared spectrum showed absorptions at 1650 and 1610 cm$^{-1}$ corresponding to the N—C≡C and C≡O groups. The $^{13}$C n.m.r. spectrum in the CDC13 with TMS as reference showed resonances at delta-170 ppm and delta-160 ppm and delta-83 ppm corresponding to the N—C≡C, O—C≡O and N—C≡C carbon atoms respectively.

An enamine solution containing about 25–33 percent by weight of DETDA can be employed in the manufacture of elastomer products using a procedure similar to that shown in Example 3.

We claim:

1. A reaction system for use in the production of mouldings and foams, said system comprising the following components:
   (A) a polyisocyanate component comprising a polyisocyanate having a molecular weight greater than 600 of the general formula:

$$T_m(R)_n \qquad (1)$$

wherein T represents a chain of more than 30 atoms, m represents an integer of at least 1, R represents an isocyanate group containing residue and n is an integer of at least 2, at least one of the residues represented by R containing at least 2 isocyanate groups separated one from another by a chain of from 2 to 30 atoms and the sum of the residues represented by R constituting less than 50% of the total molecule on a weight basis, and
   (B) an isocyanate-reactive component comprising an imino-functional compound and/or an enamine-containing compound.

2. A reaction system according to claim 1 wherein, in the polyisocyanate, T is a polyether chain.

3. A reaction system according to claim 1 wherein, in the polyisocyanate, T is a chain of more than 70 atoms, the isocyanate group containing residues being located at the end of the chains.

4. A reaction system according to claim 1 wherein said polyisocyanate component has a molecular weight in the range of 2500 to 12,000.

5. A reaction system according to claim 1 wherein, in the polyisocyanate, at least two of the isocyanate-group containing residues contain at least two isocyanate groups per residue.

6. A reaction system according to claim 1 wherein the isocyanate groups within an isocyanate group containing residue are separated by a chain of not more than 25 atoms.

7. A reaction system according to claim 1 wherein the polyisocyanate is an allophanate-modified polyisocyanate terminating in isocyanate group containing residues of the formula:

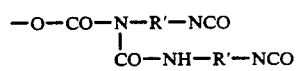

wherein R' represents a divalent hydrocarbon residue.

8. A reaction system according to claims 1 wherein the polyisocyanate is a biuret-modified polyisocyanate terminating in isocyanate group containing residues of the formula:

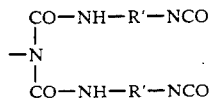

wherein R' represents a divalent hydrocarbon residue.

9. A reaction system according to claim 1 wherein, in the B component, the imino-functional compound has the structure:

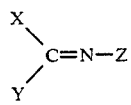

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms, said compound being capable of reacting directly with polyisocyanates without prior cleavage of the C=N bond to form a monomeric byproduct.

10. A reaction system according to claim 1 wherein, in the B component, the enamine-containing compound has the structure:

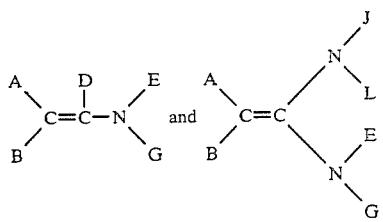

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

* * * * *